(12) United States Patent
Fazlollahi et al.

(10) Patent No.: US 8,654,887 B2
(45) Date of Patent: Feb. 18, 2014

(54) METHODS AND SYSTEMS FOR PEAK-TO-AVERAGE POWER REDUCTION WITHOUT REDUCING DATA RATE

(75) Inventors: Amir H. Fazlollahi, San Jose, CA (US); Yuchen Jia, Santa Clara, CA (US)

(73) Assignee: Futurewei Technologies, Inc., Plano, TX (US)

( * ) Notice: Subject to any disclaimer, the term of this patent is extended or adjusted under 35 U.S.C. 154(b) by 256 days.

(21) Appl. No.: 13/363,005

(22) Filed: Jan. 31, 2012

(65) Prior Publication Data

US 2013/0195213 A1 Aug. 1, 2013

(51) Int. Cl.
*H04L 27/00* (2006.01)
(52) U.S. Cl.
USPC .......................................... 375/295; 375/260
(58) Field of Classification Search
USPC .................................................. 375/295, 260
See application file for complete search history.

(56) References Cited

U.S. PATENT DOCUMENTS

| | | | |
|---|---|---|---|
| 6,314,146 B1 * | 11/2001 | Tellado et al. ................ | 375/346 |
| 6,424,681 B1 | 7/2002 | Tellado et al. | |
| 6,845,082 B2 | 1/2005 | Bourget et al. | |
| 7,532,678 B2 | 5/2009 | Henkel et al. | |
| 7,830,783 B2 | 11/2010 | Clausen et al. | |
| 7,839,947 B2 | 11/2010 | Clausen et al. | |
| 7,899,127 B2 | 3/2011 | Schenk | |
| 2001/0022777 A1 * | 9/2001 | Bourget et al. ............... | 370/210 |
| 2003/0072284 A1 * | 4/2003 | Webster et al. ............... | 370/335 |
| 2005/0157812 A1 * | 7/2005 | Liu et al. ....................... | 375/296 |
| 2009/0103639 A1 * | 4/2009 | Sankabathula et al. ........ | 375/260 |
| 2010/0020895 A1 * | 1/2010 | Jiang et al. .................... | 375/295 |
| 2010/0029347 A1 * | 2/2010 | Hellberg ........................ | 455/574 |
| 2011/0158336 A1 * | 6/2011 | Jiang ............................. | 375/260 |

FOREIGN PATENT DOCUMENTS

| | | |
|---|---|---|
| CN | 101218769 A | 7/2008 |
| CN | 101262460 A | 9/2008 |
| EP | 1662737 A2 | 5/2006 |
| WO | 2007048278 A1 | 5/2007 |

OTHER PUBLICATIONS

Foreign Communication From a Counterpart Application, PCT Application No. PCT/CN2013/071197, International Search Report dated May 9, 2013, 6 pages.

Foreign Communication From a Counterpart Application, PCT Application No. PCT/CN2013/071197, Written Opinion dated May 9, 2013, 3 pages.

(Continued)

*Primary Examiner* — Emmanuel Bayard
(74) *Attorney, Agent, or Firm* — Conley Rose, P.C.; Grant Rodolph; Nicholas K. Beaulieu

(57) ABSTRACT

A transmitter for performing multicarrier modulation comprising a processing unit configured to generate a multicarrier data signal comprising a plurality of subcarriers, wherein each of the plurality of subcarriers represents at least one data bit of a plurality of data bits, select a subset of the subcarriers based on signal quality information about one or more of the subcarriers, construct a kernel signal comprising the subset of subcarriers, and create a digital signal comprising combining the multicarrier data signal and a peak-to-average ratio (PAR) reduction signal based on the kernel signal, wherein a PAR of the digital signal is less than a PAR of the multicarrier data signal.

24 Claims, 13 Drawing Sheets

(56) References Cited

OTHER PUBLICATIONS

"Series G: Transmission Systems and Media, Digital Systems and Networks, Digital Transmission Systems—Digital Sections and Digital Line System—Access Networks, Asymmetric Digital Subscriber Line (ADSL) Transceivers" ITU-T, Telecommunication Stadardization Sector of ITU, G.992.1, Jun. 1999, 256 pages.

"Series G: Transmission Systems and Media Digital Systems and Networks, Digital Sections and Digital Line System—Access Networks, Splitterless Asymmetric Digital Subscriber Line (ADSL) Transceivers," ITU-T Telecommunication Stadardization Sector of ITU, G.992.2, Jun. 1999, 179 pages.

"Series G: Transmission Systems and Media, Digital Systems and Networks, Digital Transmission Systems—Digital Sections and Digital Line System—Access Networks, Asymmetric Digital Subscriber Line Transceivers 2 (ADSL2)," ITU-T, Telecommunication Stadardization Sector of ITU, G.992.3, Apr. 2009, 404 pages.

"Series G: Transmission Systems and Media, Digital Systems and Networks, Digital Transmission Systems—Digital Sections and Digital Line System—Access Networks, Asymmetric Digital Subscriber Line Transceivers 2 (ADSL2) Annex C: Specific Requirements for an ADSL System Operating in the Same Cable as ISDN as Defined in Appendix III of Recommendation ITU-T G.961," ITU-T, Telecommunication Standardization Sector of ITU, G.992.3, Annex C, Apr. 2009, 296 pages.

"Series G: Transmission Systems and Media Digital Systems and Networks, Digital Sections and Digital Line System—Access Networks, Splitterless Asymmetric Digital Subscriber Line Transceivers 2 (Splitterless ADSL2)," ITU-T Telecommunication Standardization Sector of ITU, G.992.4, Jul. 2002, 24 pages.

"Series G: Transmission Systems and Media, Digital Systems and Networks, Digital Transmission Systems—Digital Sections and Digital Line System—Access Networks, Asymmetric Digital Subscriber Line Transceivers 2 (ADSL2)—Extended Bandwidth (ADSL2plus), Annex C: Specific Requirements for an ADSL System Operating in the Same Cable as ISDN as defined in Appendix III of Recommendation ITU-T G.961," ITU-T, Telecommunication Stadardization Sector of ITU, G.992.5, Annex C, Jan. 2009, 66 pages.

"Series G: Transmission Systems and Media, Digital Systems and Networks, Digital Transmission Systems—Digital Sections and Digital Line System—Access Networks, Asymmetric Digital Subscriber Line Transceivers 2 (ADSL2)—Extended Bandwidth (ADSL2plus)," ITU-T, Telecommunication Standardization Sector of ITU, G.992.5, Jan. 2009, 110 pages.

"Series G: Transmission Systems and Media Digital Systems and Networks, Digital Sections and Digital Line System—Access Networks, Very High Speed Digital Subscriber Line Transceivers," ITU-T Telecommunication Standardization Sector of ITU, G.993.1, Jun. 2004, 228 pages.

"Series G: Transmission Systems and Media Digital Systems and Networks, Digital Sections and Digital Line System—Access Networks, Very High Speed Digital Subscriber Line Transceivers 2 (VDSL2)," ITU-T Telecommunication Standardization Sector of ITU, G.993.2, Dec. 2011, 376 pages.

"Series G: Transmission Systems and Media Digital Systems and Networks, Digital Sections and Digital Line System—Access Networks, Self-FEXT Cancellation (Vectoring) for use with VDSL2 Transceivers," ITU-T Telecommunication Standardization Sector of ITU, G.993.5, Apr. 2010, 80 pages.

* cited by examiner

METHODS AND SYSTEMS FOR PEAK-TO-AVERAGE POWER REDUCTION WITHOUT REDUCING DATA RATE

CROSS-REFERENCE TO RELATED APPLICATIONS

Not applicable.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Multicarrier modulation may be used in high-speed communication systems. Multicarrier modulation schemes include Discrete Multi-Tone (DMT) modulation and Orthogonal Frequency Division Multiplexing (OFDM) modulation. DMT modulation may be used in xDSL communication systems over copper in International Telecommunication Union (ITU) standards such as G.992.1 through G.992.5 as well as G.993.1, G.993.2, and G.993.5. DMT modulation is also being considered for G.fast, a standard that is in-progress. OFDM modulation may be used in radio-frequency wireless systems such as Digital Audio Broadcast systems or in wired systems, such as in ITU standard G.hn.

Multicarrier signals may experience large peak-to-average signal ratio (PAR) values, where PAR may be a ratio of an instantaneous peak power value to an average power value of a signal. Large PAR values present many challenges in designing multicarrier transceivers. A large PAR may demand large dynamic range for analog circuits and more precision for digital processing. Large dynamic range increases power consumption and cost of digital-to-analog converters (DACs), which may be needed in communication transceivers to convert digital signals into analog signals for transmission on physical media. Large dynamic range for line drivers (LDs) used for power amplification at a DAC output may demand higher voltage supplies and therefore higher power consumption. Consequently, it may be desirable to reduce PAR in multicarrier systems.

SUMMARY

In a first aspect, the invention includes a transmitter for performing multicarrier modulation comprising a processing unit configured to generate a multicarrier data signal comprising a plurality of subcarriers, wherein each of the plurality of subcarriers represents at least one data bit of a plurality of data bits, select a subset of the subcarriers based on signal quality information about one or more of the subcarriers, construct a kernel signal comprising the subset of subcarriers, and create a digital signal comprising combining the multicarrier data signal and a peak-to-average ratio (PAR) reduction signal based on the kernel signal, wherein a PAR of the digital signal is less than a PAR of the multicarrier data signal.

In another aspect, the invention includes a method for reducing a PAR in a multicarrier transmitter comprising generating a multicarrier data signal comprising a plurality of subcarriers, wherein each of the plurality of subcarriers carries at least one data bit, determining one or more locations where an estimated multicarrier data signal exceeds a predetermined threshold value and determining an amplitude of the estimated multicarrier data signal at each location, for each location, scaling a kernel signal based on the amplitude and shifting the kernel signal circularly based on the location to generate a scaled and shifted kernel signal corresponding to each location, if more than one location is determined, combining the scaled and shifted kernel signals to create a combined kernel signal and otherwise setting the combined kernel signal equal to a single scaled and shifted kernel signal, and creating a digital signal comprising combining the combined kernel signal and the multicarrier data signal, wherein a PAR of the digital signal is less than a PAR of the multicarrier data signal, and wherein the kernel signal employs a subset or all of the plurality of subcarriers.

In yet another aspect, the invention includes a transmitter for performing multicarrier modulation comprising a processing unit configured to generate a multicarrier data signal comprising a plurality of subcarriers, wherein each of the plurality of subcarriers represents at least one data bit, determine one or more locations where an estimated multicarrier data signal exceeds a predetermined threshold value and determine an amplitude of the estimated multicarrier data signal at each location, for each location, scale a kernel signal based on the amplitude and shift the kernel signal circularly based on the location to generate a scaled and shifted kernel signal corresponding to each location, wherein the kernel signal employs a subset or all of the plurality of subcarriers, if more than one location is determined, combine the scaled and shifted kernel signals to create a combined kernel signal and otherwise setting the combined kernel signal equal to a single scaled and shifted kernel signal, and create a digital signal comprising combining the combined kernel signal and the multicarrier data signal, wherein a PAR of the digital signal is less than a PAR of the multicarrier data signal.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

It should be understood at the outset that, although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

Multicarrier modulations may exhibit large ratios of peak signal value to root-mean-squared (RMS) signal value or large PAR values. A multicarrier modulated signal may be a superposition of many (e.g., hundreds or thousands) subcarriers; i.e., cosines with random amplitude, frequency, and phase. At each instance of time, a multicarrier modulated signal may be a superposition of many random signals. The distribution of such a signal at an instant in time, according to central limit theorem, may tend towards a Gaussian distribution. A Gaussian or Normal distribution may be a well-known bell-shaped distribution where a peak of the signal with this distribution can be much larger than its standard deviation a or RMS value. A probability density function of a Gaussian variable with a standard deviation a and a mean value $\mu$ is:

$$f(x) = \frac{1}{\sqrt{2\pi\sigma^2}} e^{-\frac{(x-\mu)^2}{2\sigma^2}}$$

Figure 1:
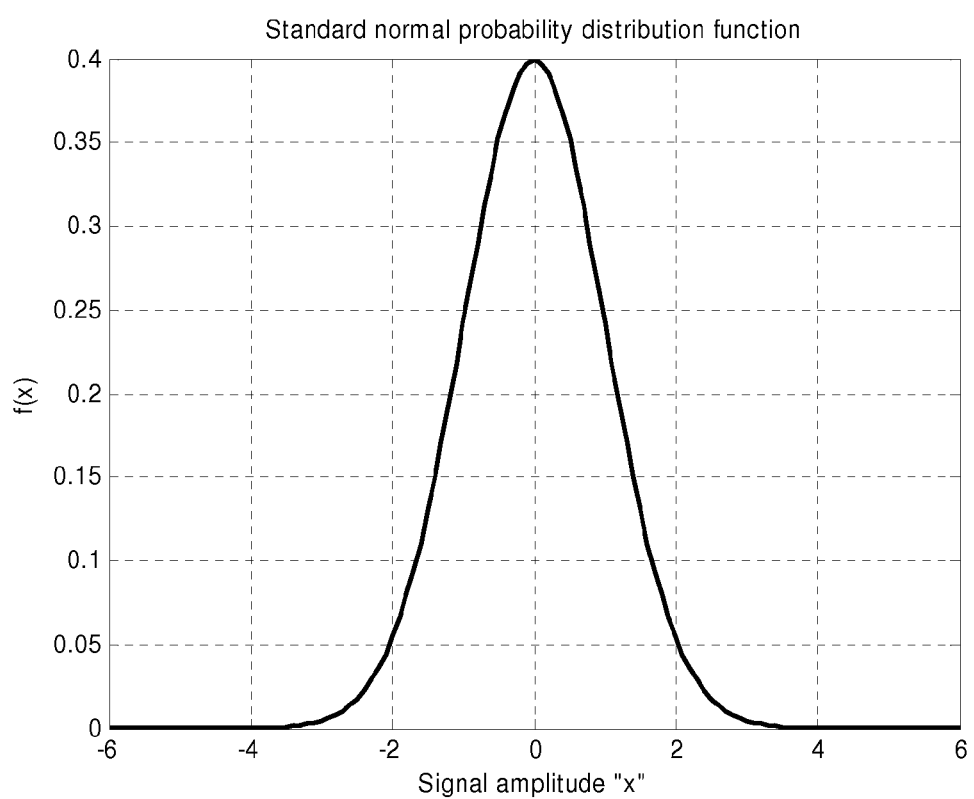
FIG. 1 shows a Gaussian distribution with a mean value of zero and a standard deviation equal to one.

FIG. 1 shows a Gaussian distribution with a mean value of zero and a standard deviation equal to one (also called Standard Normal distribution). Probabilities that a zero-mean Gaussian-distributed signal with a standard deviation a exceeds different threshold levels T re listed in Table 1.

TABLE 1

| Threshold T | Probability that the amplitude of a zero-mean Gaussian signal with standard deviation σ exceeds threshold T |
|---|---|
| T = 1σ | 3.173e−01 |
| T = 2σ | 4.550e−02 |
| T = 3σ | 2.700e−03 |
| T = 4σ | 6.334e−05 |
| T = 5σ | 5.733e−07 |
| T = 5.3σ | 1.158e−07 |
| T = 6σ | 1.973e−09 |
| T = 7σ | 2.560e−12 |

Note that a DMT or OFDM signal may be approximated as Gaussian-distributed, and the approximation becomes more accurate as larger numbers of subcarriers are used.

There may be a number of techniques to reduce PAR of a multicarrier signal. In one technique, which may be used in low-SNR (signal-to-noise ratio) scenarios in wireless communication, a multicarrier signal may be filtered using a nonlinear phase filter. A nonlinear filter flattens a signal shape slightly thus reducing a signal's peaks. Another technique uses soft nonlinear compression to reduce signal PAR at the cost of reduced SNR. However, neither of these techniques may yield satisfactory results in multicarrier systems, especially in scenarios in which each subcarrier may carry seven or more bits of information (e.g., at subcarrier SNR higher than 30 decibels (dB)).

One technique that may reduce PAR without loss of SNR in data-carrying subcarriers is a tone-reservation technique. In tone reservation, about 5% to 8% of available subcarriers may be reserved to create a signal that may have a peak at a location of a data signal peak but with an opposite sign to reduce or cancel the peak. Reserved tones (or subcarriers) may not be used to transmit data, however. Therefore, tone-reservation techniques penalize data rate to save power and cost. The data rate loss may be about 5% to 8% or more.

Tone-reservation techniques attempt to create a dirac-delta-function-like temporal signal, called a kernel signal (or kernel), from the reserved tones to cancel a signal peak without introducing new peaks when combining the kernel with multicarrier signal. However, because only a small percentage of available tones may be reserved for a kernel signal, the kernel signal may not be a good approximation to a dirac-delta function. This may be because a dirac-delta function may require a constant amplitude on all tones in a frequency domain in order to achieve a value of one at one time value (such as time zero) and a value of zero at all other time values in a time domain. Due to inaccurate kernel(s) used in tone-reservation techniques, when multiple signals peaks are present that need to be reduced, the peaks may be located and subtracted one by one in an iterative manner because every time a peak may be located and reduced by a kernel a new peak may be introduced.

Tone reservation may not be practical for high bandwidth systems, such as VDSL2 (17.6 megahertz (MHz) or 30 MHz bands) or G.fast because tone reservation may require iterations described above to locate and cancel each signal peak one by one. In each iteration the algorithm needs to determine the peak location and corresponding amplitude in time-domain signal samples. Once the peak amplitude and location is determined, a kernel may need to be scaled and shifted by these amounts for each peak and then combining with the signal. Performing iterations potentially hundreds of times to locate and reduce signal peaks in every DMT symbol for VDSL2 or G.fast may not be practical for implementation.

Systems and methods described herein do not reserve any subcarriers separate from subcarriers used to carry data. A kernel signal may be created from subcarriers that may also be used to carry data.

Figure 2:
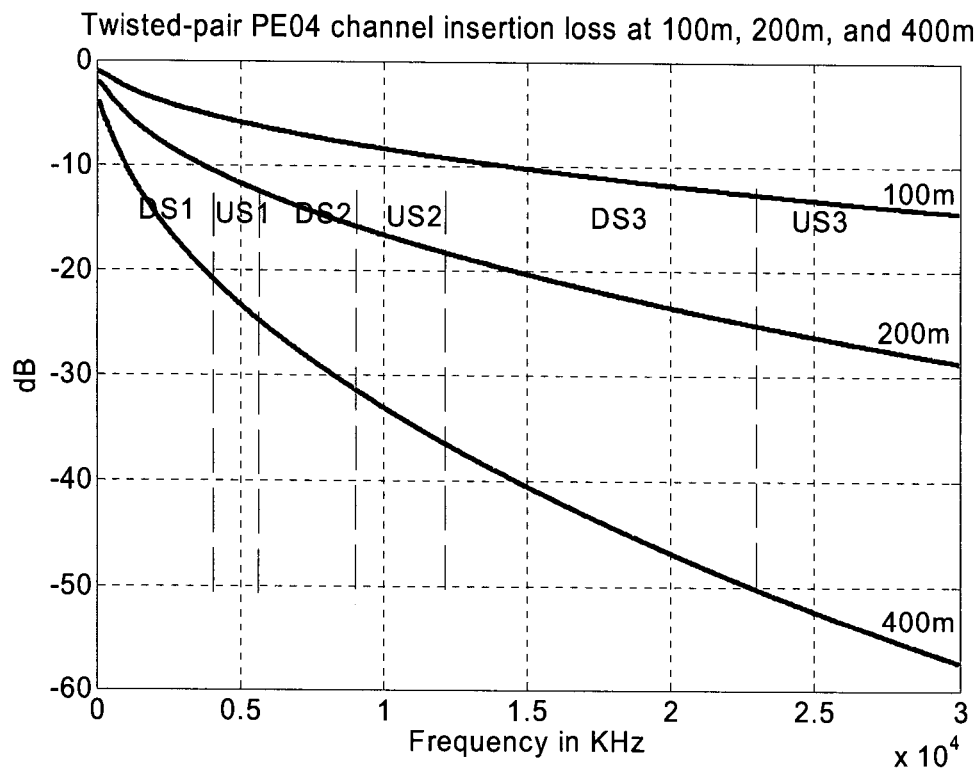
FIG. 2 shows an insertion loss of a typical twisted-pair cable versus frequency for different loop lengths.

FIG. 2 shows an insertion loss of a typical twisted-pair cable versus frequency for different loop lengths. Available bands DS1, DS2, and DS3 for downstream transmission and available bands US1, US2, and US3 for upstream transmission for a VDSL2 30 MHz system are indicated in FIG. 2. Three loop lengths of 100 meters (m), 200 m, and 400 m are shown. As shown in FIG. 2, an insertion loss of a twisted pair copper cable increases with increasing loop length and frequency. DS3 and US3 bands for downstream and upstream transmission, respectively, in a VDSL2/30 MHz system, may be attenuated more than the other bands.

Figure 3:
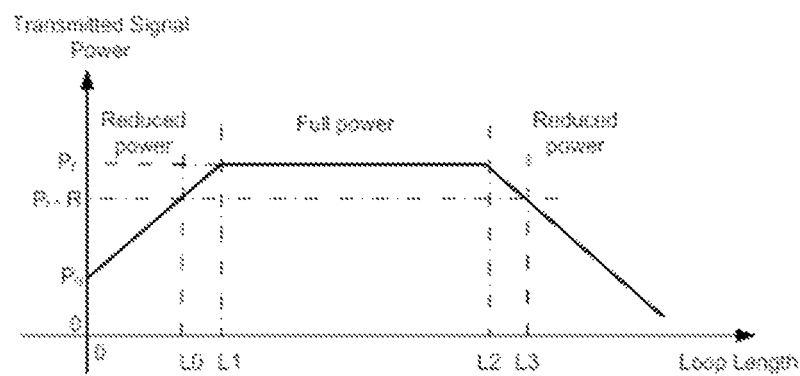
FIG. 3 shows transmitted signal power level versus loop length for a wireline modem.

FIG. 3 shows transmitted signal power level versus loop length for a wireline modem. On short loops, insertion loss across frequencies may be small. Therefore, there may be no need to transmit at full power and modems can perform power back-off to both save power and reduce crosstalk to other longer neighboring lines. On long loops, higher frequencies may be attenuated so much that they cannot be used for data transmission. Therefore, modems may transmit at full power on medium range loops and at lower power at short and long loops.

As shown in FIG. 3, a transmitter performs power backoff up to a first loop length L1. At L1 the transmitter starts transmitting full power until loop length L2 where higher frequency subcarriers may not be useful and the transmit power reduces from full power. Assuming that a PAR reduction algorithm reduces peak power by an amount represented as R dB, when the transmit power is below ($P_f$-R) dB it is not necessary to run a PAR reduction algorithm. Therefore, a PAR reduction algorithm may be useful between loop length L0 and L3. If L0 is long enough a PAR reduction algorithm may be employed that may not sacrifice data rate as described below.

Figure 4:
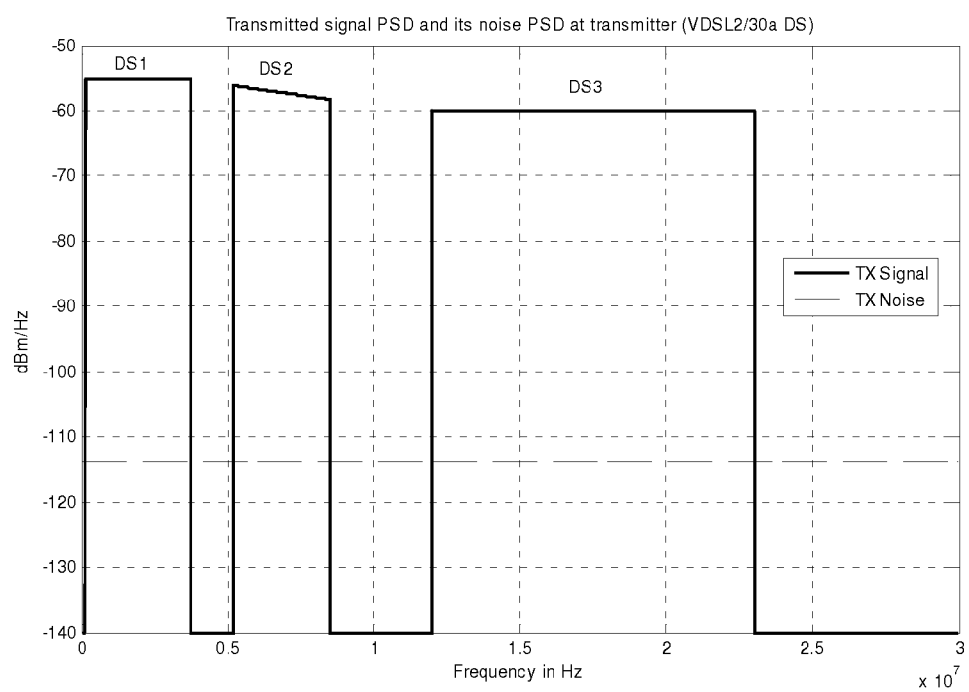
FIG. 4 shows downstream power spectral density of a transmitted signal and transmitted noise at a transmitter.
Figure 5:
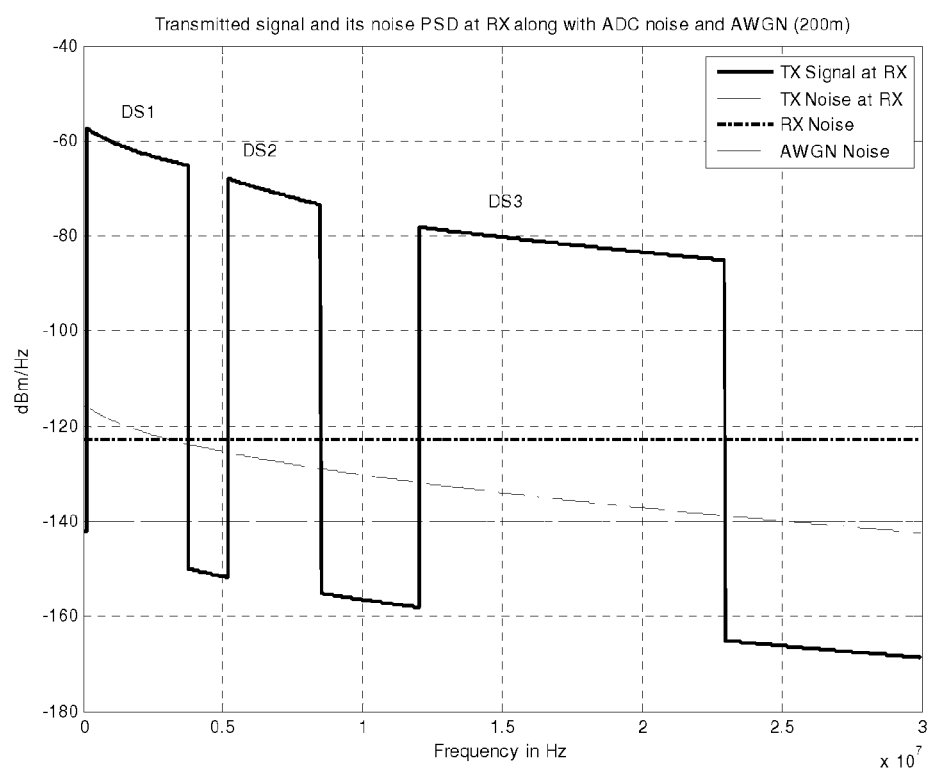
FIG. 5 shows downstream power spectral density (PSD) of a transmitted signal and a PSD transmitter noise after passing through a channel of length equal to 200 meters (m).
Figure 6:
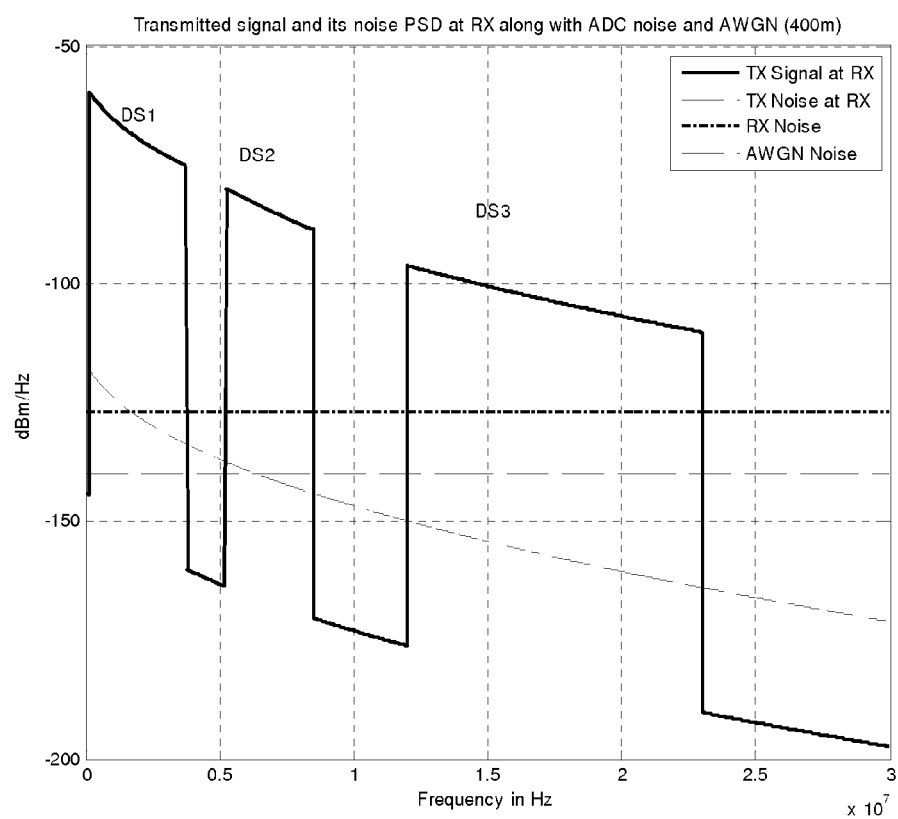
FIG. 6 shows downstream power spectral density (PSD) of a transmitted signal and a PSD transmitter noise after passing through a channel of length equal to 400 m.

FIG. 4 shows a power spectral density (PSD) of a transmitted data signal and a PSD of a transmitter noise signal at a transmitter. A transmitter noise signal may be unintended noise introduced by the transmitter and added to the transmitted data signal. FIG. 5 shows a PSD of a transmitter data signal and a PSD of a transmitter noise signal after passing through a channel of length equal to 200 m. FIG. 5 also shows a PSD of a receiver noise signal (or receiver noise) and a PSD of additive white Gaussian noise (AWGN) on the channel. Receiver noise may be a combination of noise sources, including AWGN, amplifier noise, and noise introduced by analog-to-digital converters (ADCs). FIG. 6 shows a downstream PSD of a transmitted data signal and a PSD of transmitter noise signal after passing through a channel of length equal to 400 m. FIG. 6 also shows a PSD of receiver noise and a PSD of additive white Gaussian noise (AWGN) on the channel. Note that for 200 m and 400 m loops the transmitter noise signal at a receiver may be well below the receiver noise at many higher frequencies due to the transmitter noise having been attenuated by the channel. This means even if a transmitter SNR at these higher frequencies is degraded, a data rate of a communication system may not be affected. A kernel signal constructed from the tones in these higher frequencies may not affect data rate as long as the tones used to construct the kernel signal are not stronger than a receiver noise.

The transmitted signal SNR may be reduced significantly at a receiver on longer loops and at higher frequencies. For example, transmitter SNRs of about 53 dB for DS3 subcarriers may result in receiver SNRs of about 20 dB to 25 dB at higher frequencies after 400 m long line as demonstrated in FIGS. 4 and 6. Subcarrier SNRs may be even more degraded if crosstalk from other lines is taken into account (crosstalk is not illustrated in FIGS. 5 and 6). Note that crosstalk coupling may be stronger at higher frequencies than lower frequencies.

Consequently, in many loops and under many noise conditions, it may not be necessary to transmit high SNRs in some subcarriers. For example, subcarrier transmit SNR may be reduced by few dB to few tens of dB without affecting the communication link performance. When a transmitter noise at receiver is below a receiver noise level a PAR reduction algorithm as described below may be used. Note that unlike the tone-reservation method described above that limits the PAR reduction tones to about 5% to 8% of the transmitted tones, many more tones may be available. Therefore, the kernel signal may be designed to better approximate a dirac-delta kernel. As an additional benefit, the average energy in each tone may be smaller because the energy of the kernel signal may be distributed over many more tones. By optimizing a design of a kernel signal dependent on the loop length and SNRs for different frequencies, PARs of DMT and/or OFDM signals may be reduced without reserving specific tones for a kernel signal and thus without sacrificing performance. As an additional benefit, because it may now be possible to construct a kernel signal with termporal characteristics closer to a dirac-delta function, the need for iteratively cancelling data signal peaks one by one may be eliminated, as describe further below. All the peaks above a predetermined threshold may be detected once and a combined kernel signal, which may be a superposition of shifted and scaled versions of a kernel signal, may be determined once and all peaks reduced by one summation or subtraction operation without the need for iterations. A combined kernel signal may be viewed as a PAR reduction signal.

Figure 7:
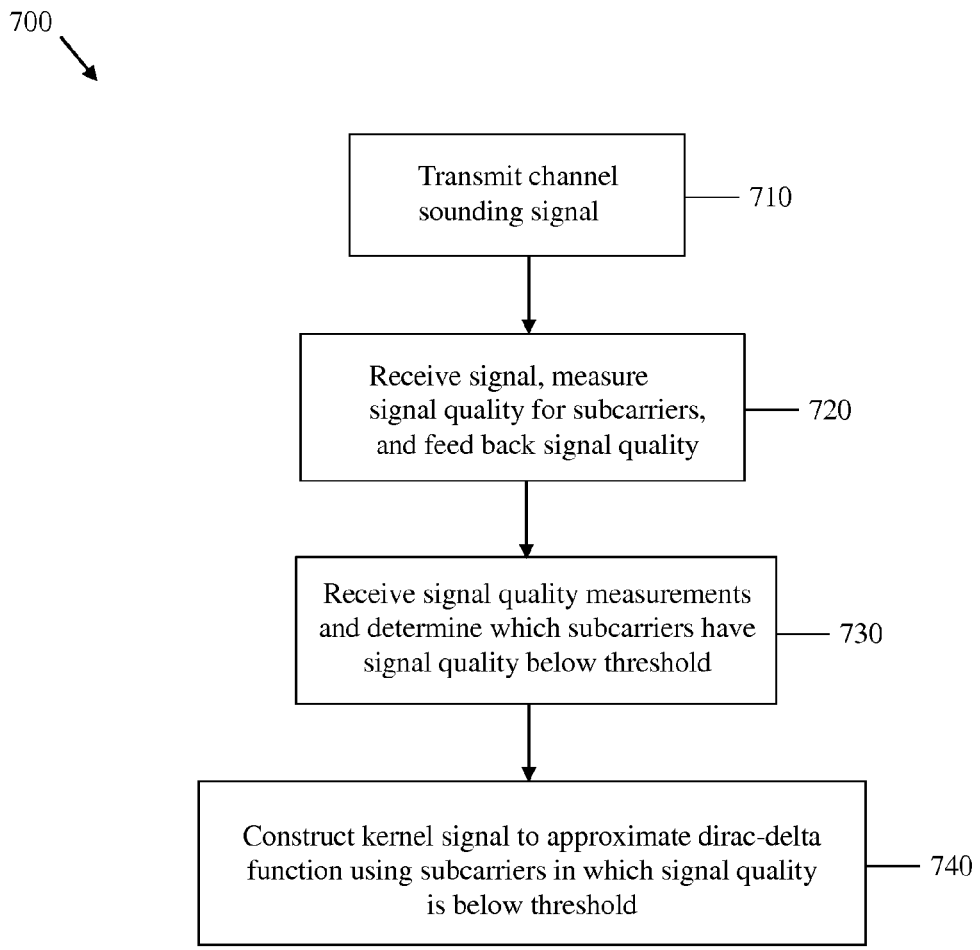
FIG. 7 is a flowchart of an embodiment of a method for constructing a kernel signal.

FIG. 7 is a flowchart of an embodiment of a method for constructing a kernel signal. For the purpose of constructing a kernel signal, tones may be discovered during initial handshake procedures and/or later during channel discover and training phases. Tones may be selected that have significantly lower received SNR as compared to the transmitted SNR.

In step 710, a channel sounding signal may be transmitted. A channel sounding signal may use a same set of subcarriers as used for data signals. In step 720, the transmitted channel sounding signal may be received, and channel quality for all subcarriers may be determined. Channel quality may be an estimate of subcarrier SNR, for example. Channel quality measurements for various subcarriers may be fed back to a transmitter in step 720. In step 730, signal quality measurements may be received at the transmitter. The transmitter may determine which subcarriers have a signal quality below a threshold and designate these subcarriers as subcarriers to be used to construct a kernel signal, referred to as kernel signal subcarriers. Some or all the subcarriers may be kernel signal subcarriers. Further, kernel signal subcarriers may be determined during a handshake phase or later during channel discover and training phases. In step 740, a kernel signal may be constructed using kernel signal subcarriers to approximate a dirac-delta function. One way to construct a kernel signal may be to set a value of kernel signal subcarriers to a same value in a frequency domain with a value of all other subcarriers that are not kernel signal subcarriers to zero in a frequency domain. The larger number of kernel signal subcarriers used the better the kernel signal approximates a dirac-delta function. A kernel may be constructed on the fly or a number of kernels may be constructed and stored in advance and the appropriate one selected and loaded after a channel analysis and exchange phase. Finally, another embodiment may determine signal quality based on predictions at the transmitter. The predictions may be based on initial handshake information exchanged between two modems.

Figure 8:
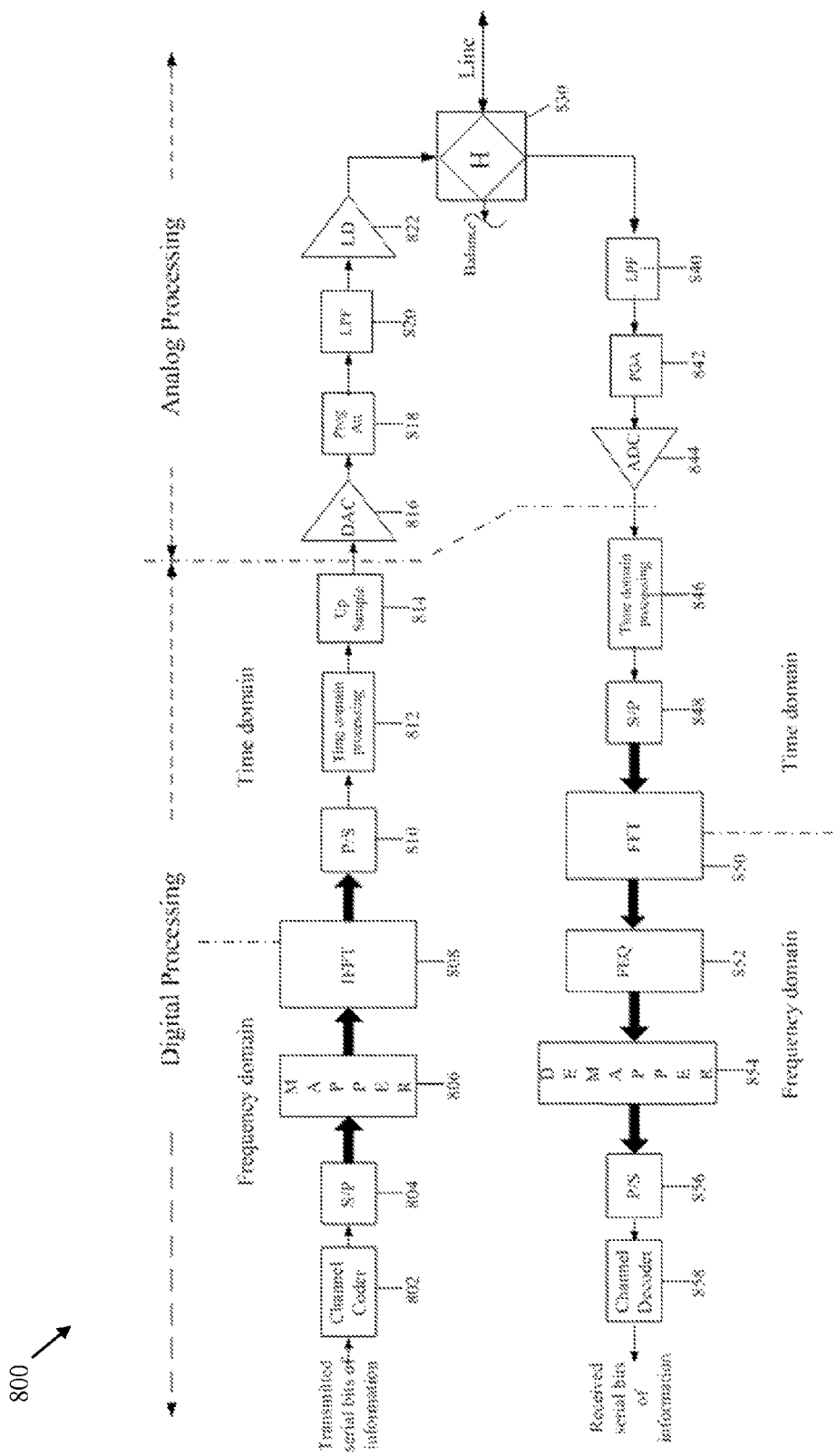
FIG. 8 is a schematic diagram of an embodiment of a discrete multitone (DMT) transceiver.

FIG. 8 is a schematic diagram of an embodiment of a DMT transceiver 800. OFDM transceivers may be similar, but DMT transceivers are used for illustrative purposes. DMT transceiver 800 comprises a transmit path comprising a channel coder 802, serial-to-parallel (S/P) converter 804, signal mapper 806, inverse fast Fourier transform (IFFT) modulator block 808, parallel-to-serial (P/S) converter 810, time domain processing block 812, upsampler 814, digital-to-analog converter (DAC) 816, programmable attenuator 818, low pass filter 820, line driver (LD) 822, and hybrid circuit 830 configured as shown in FIG. 8. Information bits to be transmitted may be scrambled by an scrambler block (not shown in the figure) and then may be encoded by a channel coder 802. A S/P converter 804 may pick an appropriate number of encoded bits to be mapped into each subcarrier by a mapper 806. Mapper 806 may include a trellis encoder. Mapped bits may create a complex frequency-domain digital signal at an IFFT modulator 808 input. The IFFT modulator 808 may convert the accumulation of mapped complex digital signals in frequency domain into an accumulation of real (in case of DMT) or complex (in case of OFDM) time-domain signal. A P/S converter 810 prepares the time-domain signal for serial processing.

A time-domain processing block 812 may perform insertion of a cyclic prefix and a suffix as well as transmit windowing and filtering. The processed time-domain signal then may be up-sampled (or interpolated) in an upsampler block 814 before being provided to a DAC 816 to convert a digital signal into an analog signal. The analog signal may be transmitted using an analog transmitter or analog portion of the multicarrier transmitter. The analog portion may comprise a programmable attenuator 818, low pass filter 820, LD 822, and hybrid circuit 830 arranged as shown in FIG. 8. The analog signal may be attenuated by a programmable attenuator 818 and filtered by a low pass filter 820. Further, the analog signal may be amplified by a LD 822. A hybrid circuit 830 that may be used in a frequency-division-duplex (FDD) wireline system. The role of a hybrid circuit 830 may be to separate transmit and received paths of the transceiver. In a transmit direction hybrid circuit 830 passes the transmitted signal into the line and blocks the transmitted signal being passed into a receive path. Alternatively, when transceiver 800 is acting as a receiver, the hybrid circuit 830 blocks a received signal from getting into a transmit path.

DMT transceiver 800 comprises a receive path configured to receive signals from a line. In addition to hybrid circuit 830 described earlier, the DMT transceiver receive path comprises a low pass filter 840, a programmable gain amplifier (PGA) 842, an analog-to-digital converter (ADC) 844, time domain processing block 846, S/P converter 848, a fast Fourier transform (FFT) block 850, a frequency domain equalizer (FEQ) 852, a demapper block 854, a P/S converter 856, and a channel decoder 858 configured as shown in FIG. 8. The received signal may pass through a low-pass filter LPF 840, then may be amplified by a PGA 842 and next converted to a digital signal by an ADC 844. The digital signal may be processed by a time domain processing block 846 before converted to a parallel signal by a S/P converter 848 and provided to FFT block 850. FFT block 850 may act as a demodulator and with the help of FEQ 852 attempts to recover a transmitted frequency domain signal. A demapper 854 may convert the signal into data bits. The demapper 854 may include a Viterbi decoder if a trellis encoder is used at the transmitter. The data bits may be then converted to serial bits or bytes by a P/S converter 856 and further processed by channel decoder 858 to correct errors that may have been introduced in the line by noise and other disturbances. Channel decoder 858 output then may be provided to a descrambler (not shown) to convert received data bits to information bits.

DMT transceiver 800 may be used to construct one or more kernel signals using the methods described previously. For example, transceiver 800 may perform steps 710, 730, and 740. Another transceiver, which may be similar to transceiver 800, may be paired with the transceiver 800 to perform step 720. One or more kernel signals may be employed in a PAR reduction algorithm.

A PAR reduction algorithm may run at a transmitter, such as transceiver 800. A PAR reduction algorithm may employ a time-domain signal at an IFFT output, such as an output of IFFT block 808 in FIG. 8, to determine a location and amplitude of signal values exceeding a predetermined threshold value T. Then a position and amplitude of a kernel signal may be adjusted such that when added to a data signal will reduce the data signal peak below threshold T. There may be more than one peak exceeding threshold T. If a kernel signal is similar enough to a dirac-delta function in the time domain there may be no need for iterations to reduce peaks and all signal peaks may be reduced by a combined kernel signal, which may be a superposition of an original kernel scaled and shifted (circularly) by each peak's amplitude and location, respectively.

Figure 9:
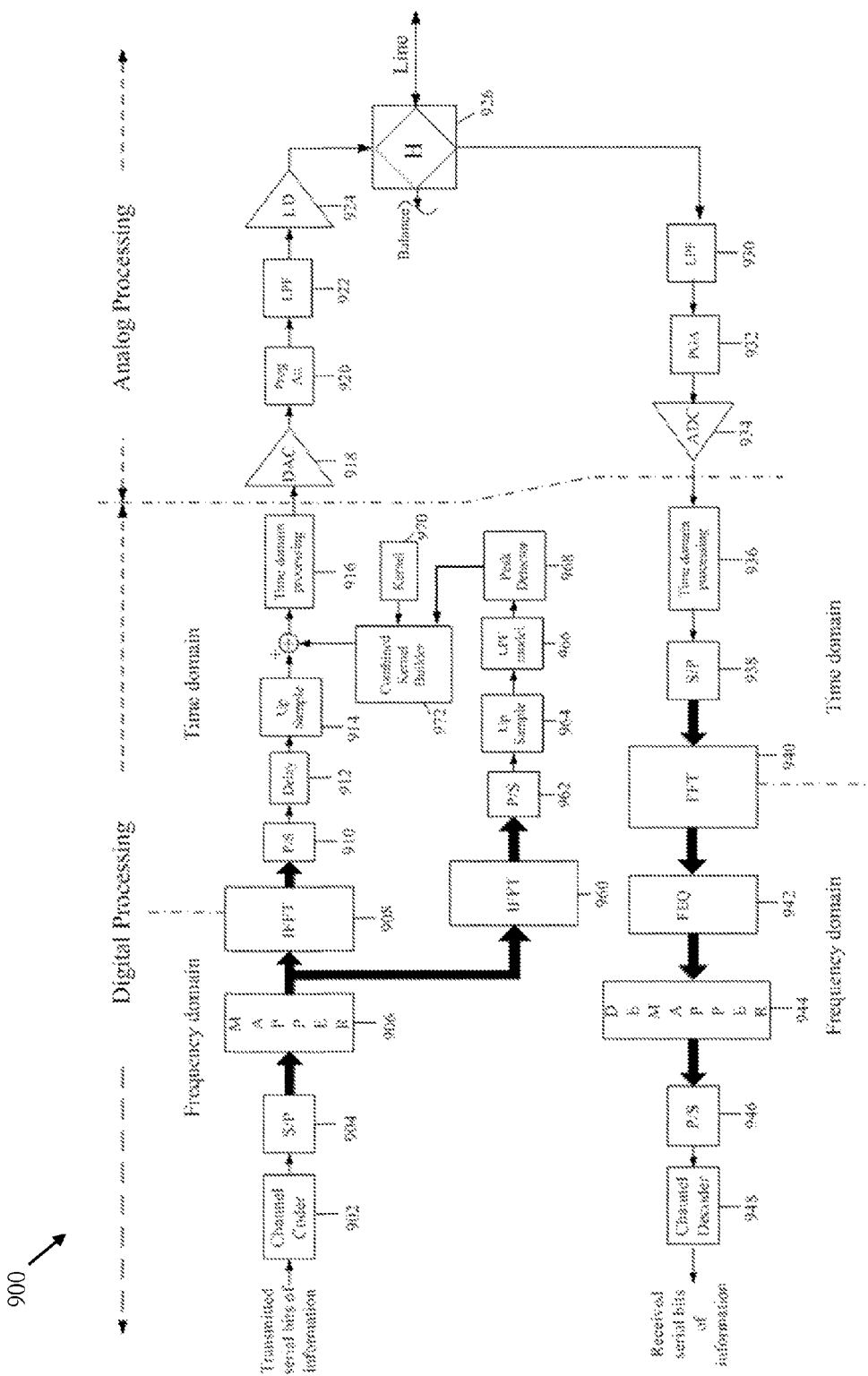
FIG. 9 is a schematic diagram of an embodiment of a DMT transceiver with PAR reduction.

FIG. 9 is a schematic diagram of an embodiment of a DMT transceiver 900 with PAR reduction. DMT transceiver 900 may use one or more kernel signals that were constructed using methods described previously. The DMT transceiver 900 comprises a main data transmit path comprising a channel coder 902, S/P converter 904, signal mapper 906, IFFT block 908, P/S converter 910, upsampler 914, time domain processing block 916, DAC 918, programmable attenuator 920, low pass filter 922, line driver 924, and hybrid circuit 926 configured as shown in FIG. 9. These elements may be similar to those described earlier for DMT transceiver 800.

In addition to the above elements in a transmit path, DMT transceiver 900 comprises additional elements for PAR reduction in a PAR reduction path. Namely, DMT transceiver 900 further comprises IFFT block 960, P/S converter 962, upsampler 964, a low pass filter 966, peak detector 968, kernel signal storage 970, and combined kernel builder 972 configured as shown in FIG. 9. Also, a delay block 912 may be introduced on a main path to account for delays due to a PAR reduction algorithm. The PAR of a signal may increase after upsampling and conversion to an analog domain. Thus, it may be desirable that a PAR reduction algorithm operates at higher sampling rate than the minimum size IFFT output sampling rate. Hence, upsampling block 964 may be employed to upsample a signal used for PAR reduction.

The PAR of a signal that is reduced in a digital domain may increase in an analog domain after the LPF 922. For this reason, the LPF 922 may need to be modeled and taken into account when performing PAR reduction to make sure that the PAR remains below a target PAR at LPF 922 output. Digital LPF 966 models analog low pass filtering effects, such as LPF 922. An output of digital LPF 966 may be considered an estimate of a data signal in which analog effects may be taken into account.

The peak detector 968 attempts to detect where peaks exceeding a threshold T occur in the transmitted signal. Kernel signal storage 970 stores one or more kernel signals. The kernel signals may have been constructed by DMT transceiver 900 using methods described earlier, such as the method described with respect to FIG. 7. Each kernel signal may employ one or more subcarriers employed by DMT transceiver 900 for data transmission.

Combined kernel builder 972 may use inputs from peak detector 968 and kernel signal storage 970 to construct a combined kernel signal, which may be viewed as a PAR reduction signal. For example, if M peaks are detected, where M is an integer, M kernel signals may be combined (or superimposed) to create a combined kernel signal, one kernel signal corresponding to each peak. The M kernel signals may be scaled and circularly shifted versions of one kernel signal, wherein the scaling and circular shift may depend on the peak amplitude and location, respectively, being addressed. There may be only one peak, in which case M equals one, and the combined kernel signal or PAR reduction signal may comprise only one shifted and scaled kernel signal.

Generally, a combined kernel signal may be subtracted from a data signal in a time domain or a frequency domain. Because the number of tones used to construct a combined kernel signal may be large, it may not be efficient to build the combined kernel signal in a frequency domain. Thus, it may be preferable to construct the combined kernel signal and subtract it from a data signal in a time domain, as demonstrated in DMT transceiver 900, where the data signal (i.e., signal at the output of upsampler 914) may be added to the combined kernel signal (i.e., signal at output of combined kernel builder 972). A net effect is that the PAR value of a data signal may be higher than the data signal combined with the combined kernel signal.

The DMT transceiver 900 comprises a received signal path similar to the DMT transceiver 800 and configured to receive signals from a line. That is, the DMT transceiver 900 receive path comprises a low pass filter 930, a PGA 932, an ADC 934, time domain processing block 936, S/P converter 938, a FFT block 940, a FEQ 942, a demapper block 944, a P/S converter 946, and a channel decoder 948 configured as shown in FIG. 9.

Figure 10:
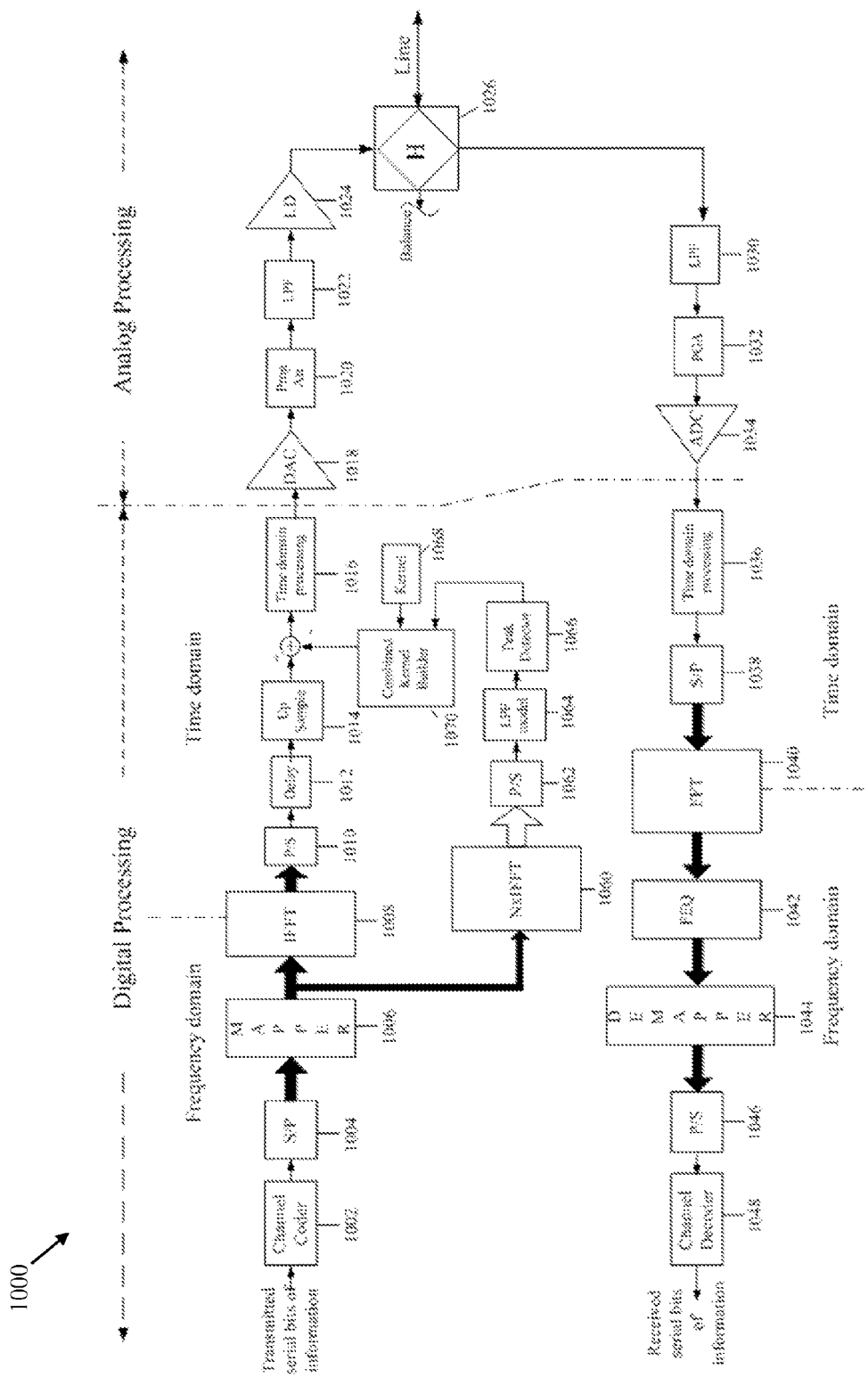
FIG. 10 is a schematic diagram of a second embodiment of a DMT transceiver with PAR reduction.

FIG. 10 is a schematic diagram of a second embodiment of a DMT transceiver with PAR reduction. The DMT transceiver 1000 comprises a main transmit path comprising a channel coder 1002, S/P converter 1004, signal mapper 1006, IFFT block 1008, P/S converter 1010, delay block 1012, upsampler 1014, time domain processing block 1016, DAC 1018, programmable attenuator 1020, low pass filter 1022, line driver 1024, and hybrid circuit 1026 configured as shown in FIG. 10. These elements may be similar to those described earlier for DMT transceiver 900.

In addition to the elements in a main transmit path described above, DMT transceiver 1000 comprises additional elements for PAR reduction in a transmit path. Namely, DMT transceiver 1000 further comprises IFFT block 1060, P/S converter 1062, low pass filter 1064, peak detector 1066, kernel signal storage 1068, and a combined kernel builder 1070 configured as shown in FIG. 10. In the DMT transceiver 1000 a PAR reduction algorithm may run at higher sampling rate than the minimum IFFT output sampling rate by using a higher IFFT size by N times, where N is an integer. This approach is reflected in DMT transceiver 1000 by the IFFT block 1060, which uses a higher IFFT size by N times. This approach is different than that taken in DMT transceiver 900, which employed an upsampler 964 to increase the sampling rate of the PAR algorithm. The P/S converter 1062, low pass filter 1064, peak detector 1066, kernel storage block 1068, and combined kernel signal builder 1070 are similar to those elements of the same name described above for DMT transceiver 900.

The DMT transceiver 1000 comprises a received signal path similar to the DMT transceiver 900 and configured to receive signals from a line. That is, the DMT transceiver 1000 receive path comprises a low pass filter 1030, a PGA 1032, an ADC 1034, time domain processing block 1036, S/P converter 1038, a FFT block 1040, a FEQ 1042, a demapper block 1044, a P/S converter 1046, and a channel decoder 1048 configured as shown in FIG. 10.

Because the number of tones used to construct a kernel signal may be large, it may not be efficient to construct the combined kernel in a frequency domain and it may be preferred that the combined kernel be both constructed and subtracted from a data signal in a time domain, as in FIGS. 9 and 10. However, it may be necessary for a speed of an interface between a digital portion, such as a digital chip, and an analog portion, such as an analog chip, to be kept relatively low, to save power and cost, in which case a combined kernel signal may be constructed and subtracted from a data signal in a frequency domain, as in FIGS. 11 and 12 below In this case up-sampling (i.e., interpolation), while a digital operation, will be performed inside the analog chip. The analog chip is a part of the Analog Processing shown in FIGS. 8-12.

Figure 11:
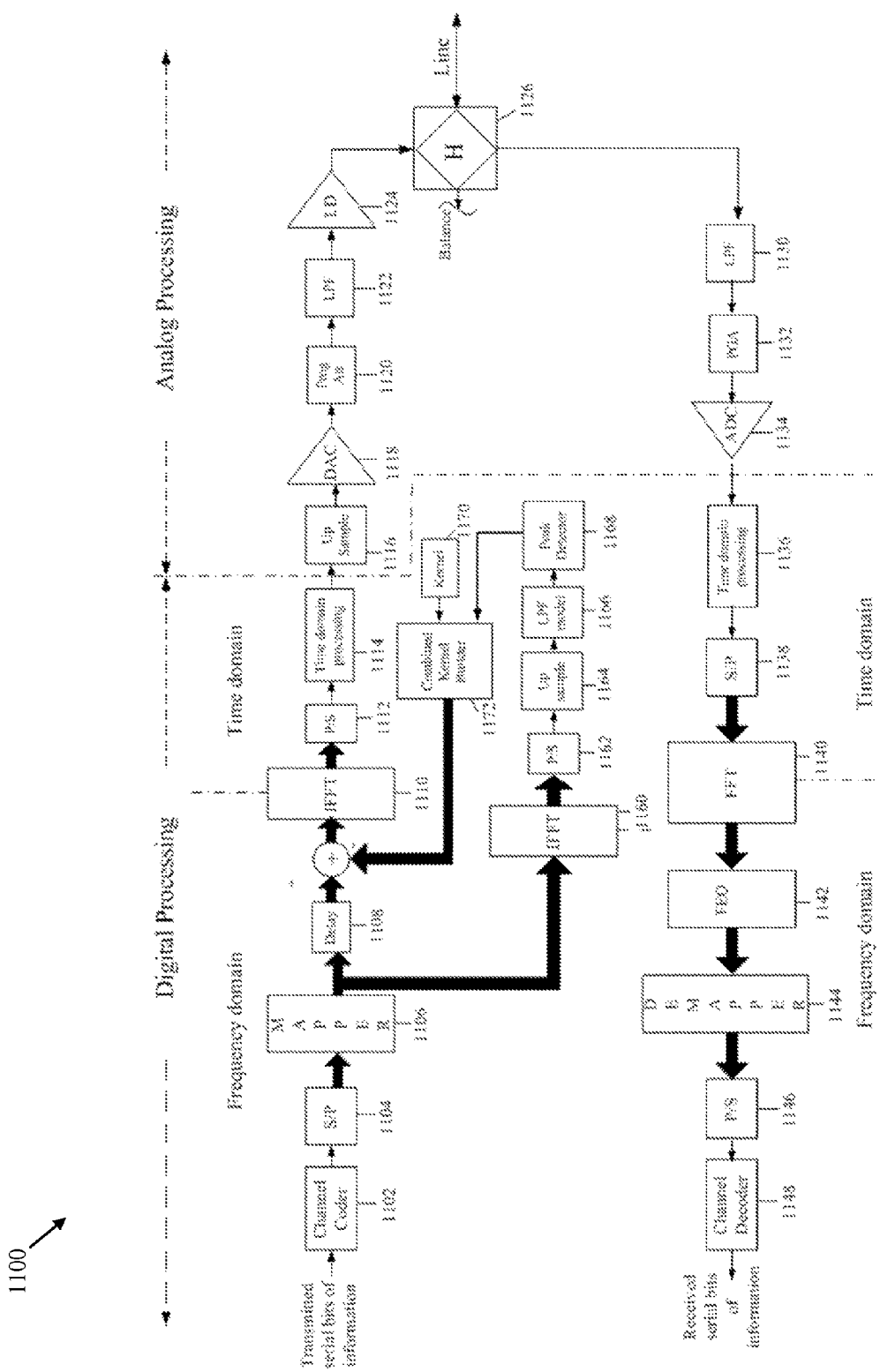
FIG. 11 is a schematic diagram of a third embodiment of a DMT transceiver with PAR reduction.

FIG. 11 is a schematic diagram of a third embodiment of a DMT transceiver with PAR reduction. In this embodiment, a combined kernel signal may be constructed and subtracted from a data signal in a frequency domain as described below. The DMT transceiver 1100 comprises a main transmit path comprising a channel coder 1102, S/P converter 1104, signal mapper 1106, delay block 1108, IFFT block 1110, P/S converter 1112, time domain processing block 1114, upsampler 1116, DAC 1118, programmable attenuator 1120, low pass filter 1122, line driver 1124, and hybrid circuit 1126 configured as shown in FIG. 11. These elements may be similar to those described earlier for DMT transceiver 1000.

In addition to the elements in a transmit path described above, DMT transceiver 1100 comprises additional elements for PAR reduction in a transmit path. Namely, DMT transceiver 1100 further comprises IFFT block 1160, P/S converter 1162, upsampler 1164, low pass filter 1166, peak detector 1168, kernel signal storage 1170, and a combined kernel builder 1172 configured as shown in FIG. 11. The IFFT block 1160, P/S converter 1162, upsampler 1164, low pass filter 1166, peak detector 1168, and kernel signal storage 1170 are similar to those elements of the same name described above for DMT transceiver 900. One difference between DMT transceiver 1100 and the DMT transceivers described earlier may be that the combined kernel builder 1172 outputs a combined kernel signal in a frequency domain, rather than a time domain. The combined kernel signal may then be subtracted from a data signal in the frequency domain.

The DMT transceiver 1100 comprises a received signal path similar to the DMT transceiver 1000 and configured to receive signals from a line. That is, the DMT transceiver 1100 receive path comprises a low pass filter 1130, a PGA 1132, an ADC 1134, time domain processing block 1136, S/P converter 1138, a FFT block 1140, a FEQ 1142, a demapper block 1144, a P/S converter 1146, and a channel decoder 1148 configured as shown in FIG. 11.

Figure 12:
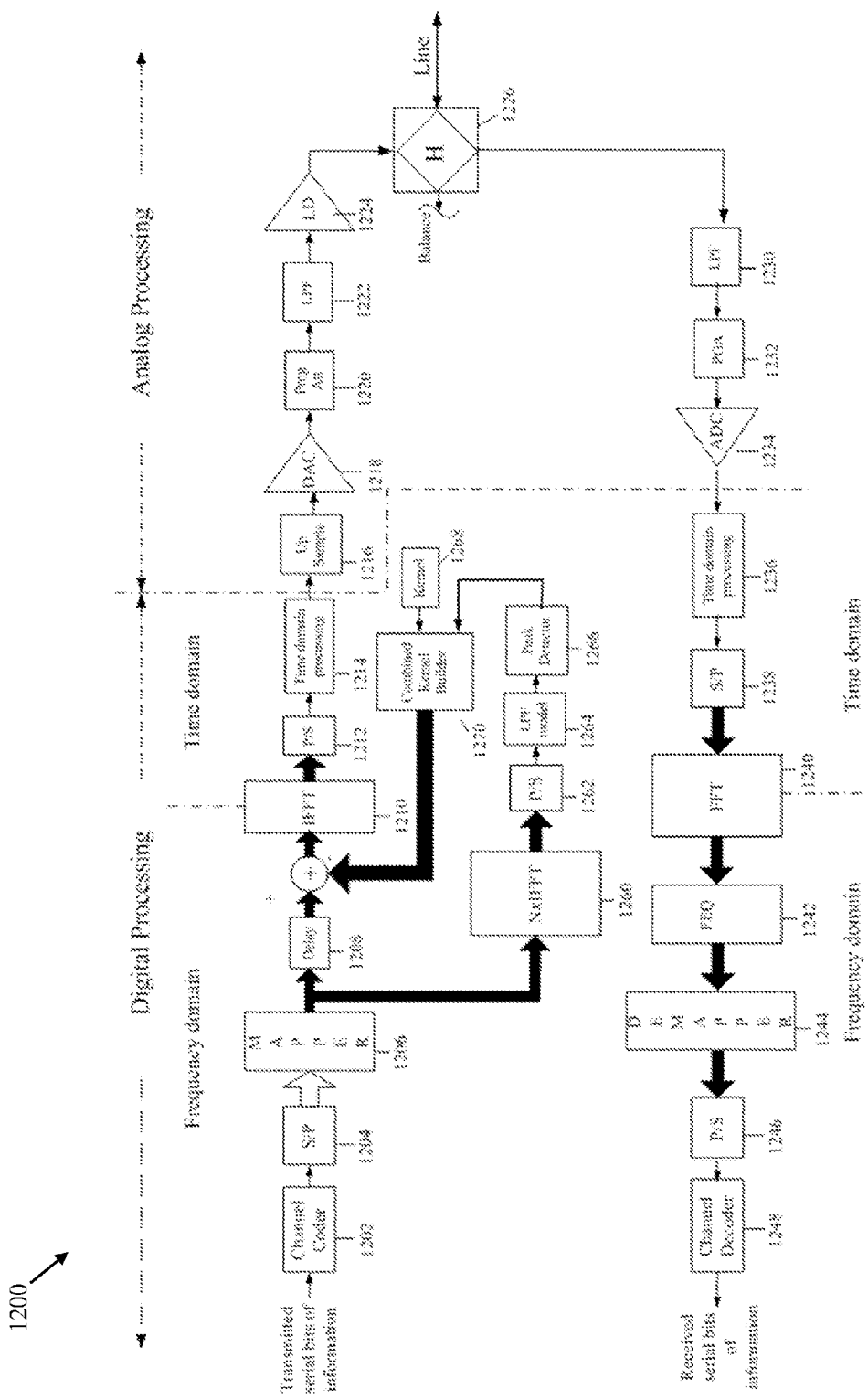
FIG. 12 is a schematic diagram of a fourth embodiment of a DMT transceiver with PAR reduction.

FIG. 12 is a schematic diagram of a fourth embodiment of a DMT transceiver with PAR reduction. In the DMT transceiver 1200 a PAR reduction algorithm may run at higher sampling rate than the minimum IFFT output sampling rate using larger size IFFT, and the combined kernel may be constructed and subtracted in a frequency domain as described below. The DMT transceiver 1200 comprises a main transmit path comprising a channel coder 1202, S/P converter 1204, signal mapper 1206, delay block 1208, IFFT block 1210, P/S converter 1212, time domain processing block 1214, upsampler 1216, DAC 1218, programmable attenuator 1220, low pass filter 1222, line driver 1224, and hybrid circuit 1226 configured as shown in FIG. 12. These elements may be similar to those described earlier for DMT transceiver 1100.

In addition to the elements in a transmit path described above, DMT transceiver 1200 comprises additional elements for PAR reduction in a transmit path. Namely, DMT transceiver 1200 further comprises IFFT block 1260, P/S converter 1262, low pass filter 1264, peak detector 1266, kernel signal storage 1268, and a combined kernel builder 1270 configured as shown in FIG. 12. The combined kernel builder 1270 may be similar to the combined kernel builder 1172 described above for DMT transceiver 1170. For example, combined kernel builder 1270 outputs a combined kernel signal in a frequency domain. IFFT block 1260 may be similar to IFFT block 1060 described above for DMT transceiver 1000. For example, IFFT block 1260 uses a higher FFT size by N times to increase the sampling rate of the PAR algorithm.

The DMT transceiver 1200 comprises a received signal path similar to the DMT transceiver 1100 and configured to receive signals from a line. That is, the DMT transceiver 1200 receive path comprises a low pass filter 1230, a PGA 1232, an ADC 1234, time domain processing block 1236, S/P converter 1238, a FFT block 1240, a FEQ 1242, a demapper block 1244, a P/S converter 1246, and a channel decoder 1248 configured as shown in FIG. 12.

In FIGS. 9 and 10, a main data signal path may use a smaller IFFT followed by upsampling (i.e., interpolates) and then performing time-domain processing before sending the signal to a DAC. In FIGS. 11 and 12, a main data signal path may use a smaller IFFT, followed by time-domain processing, and then upsampling before sending the signal to a DAC for reasons discussed previously. Alternatively, a main data path may use oversampling using a larger size IFFT. If a larger size IFFT is used on a main data path, the IFFT block on a main data path of each of FIGS. 9-12 may be replaced by NxIFFT to indicate a larger size IFFT by N times, and the upsampler block, such as upsampler 914, may be eliminated or have its upsampling ratio decreased depending on the value of N. In many applications, N may equal to two. The upsampling rate may depend on the IFFT output sampling rate and the DAC's operating rate.

For kernel signals constructed with temporal characteristics closer to a dirac-delta function, as described herein, the need for iteratively cancelling data signal peaks one by one may be eliminated. All the peaks above a predetermined threshold may be detected once and a combined kernel signal, which is a superposition of shifted and scaled version of a kernel signal, may be found at once and all peaks reduced without a need for iteration. Thus, the methods and systems disclosed herein may significantly reduce the amount of processing needed for PAR reduction and thus make PAR reduction more practical for high-speed communication systems.

Figure 13:
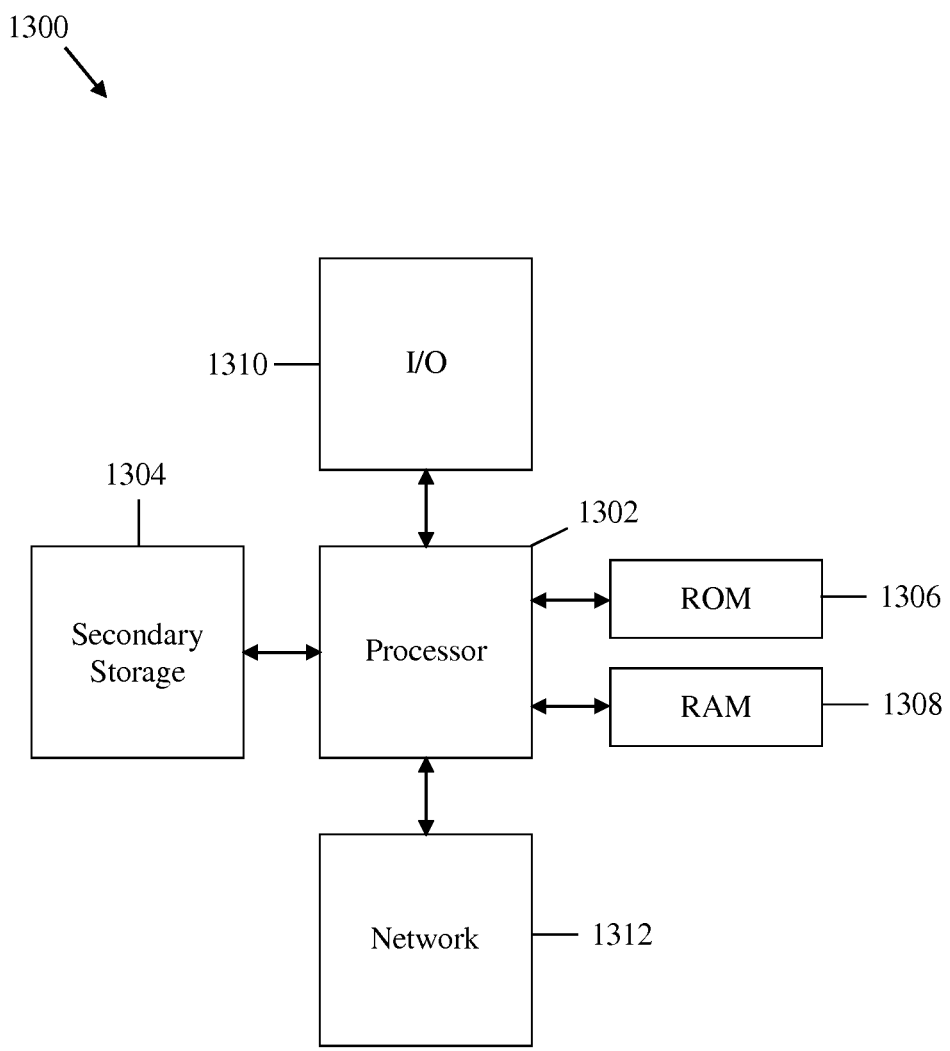
FIG. 13 illustrates a general-purpose network component.

FIG. 13 illustrates a general-purpose network component 1300 suitable for implementing one or more embodiments of the components disclosed herein. The network component 1300 includes a processor 1302 that is in communication with memory devices including secondary storage 1304, read only memory (ROM) 1306, random access memory (RAM) 1308, input/output (I/O) devices 1310, and network connectivity devices 1312. The processor 1302 may be implemented as one or more CPU chips and may include one or more digital signal processing chips (or digital signal processors). The processor 1302 may comprise all or part of digital portions of DMT transceivers 900, 1000, 1100, and 1200 and may be configured to implement at least some of the steps of the method 700. The processor 1302 may comprise general purpose hardware, such as a central processing unit (CPU), that is configured to couple to a processing unit, which may comprise special purpose hardware, such as filters and IFFT components, that comprise digital portions on DMT transceivers 900, 1000, 1100, and 1200. Alternatively, a processing unit may comprise a processor, such as processor 1302. The I/O device 1310 may include an analog chip and additional analog processing components.

The secondary storage 1304 is typically comprised of one or more disk drives or tape drives and is used for non-volatile storage of data and as an over-flow data storage device if RAM 1308 is not large enough to hold all working data. Secondary storage 1304 may be used to store programs that are loaded into RAM 1308 when such programs are selected for execution. The ROM 1306 is used to store instructions and perhaps data that are read during program execution. ROM 1306 is a non-volatile memory device that typically has a small memory capacity relative to the larger memory capacity of secondary storage 1304. The RAM 1308 is used to store volatile data and perhaps to store instructions. Access to both ROM 1306 and RAM 1308 is typically faster than to secondary storage 1304.

At least one embodiment is disclosed and variations, combinations, and/or modifications of the embodiment(s) and/or features of the embodiment(s) made by a person having ordinary skill in the art are within the scope of the disclosure. Alternative embodiments that result from combining, integrating, and/or omitting features of the embodiment(s) are also within the scope of the disclosure. Where numerical ranges or limitations are expressly stated, such express ranges or limitations may be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, $R_l$, and an upper limit, $R_u$, is disclosed, any number falling within the range is specifically disclosed. In particular, the following numbers within the range are specifically disclosed: $R=R_l+k*(R_u-R_l)$, wherein k is a variable ranging from 1 percent to 100 percent with a 1 percent increment, i.e., k is 1 percent, 2 percent, 3 percent, 4 percent, 5 percent, . . . , 50 percent, 51 percent, 52 percent, . . . , 95 percent, 96 percent, 97 percent, 98 percent, 99 percent, or 100 percent. Moreover, any numerical range defined by two R numbers as defined in the above is also specifically disclosed. Use of the term "optionally" with respect to any element of a claim means that the element is required, or alternatively, the element is not required, both alternatives being within the scope of the claim. Use of broader terms such as comprises, includes, and having may be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present disclosure. The discussion of a reference in the disclosure is not an admission that it is prior art, especially any reference that has a publication date after the priority date of this application. The disclosure of all patents, patent applications, and publications cited in the disclosure are hereby incorporated by reference, to the extent that they provide exemplary, procedural, or other details supplementary to the disclosure.

While several embodiments have been provided in the present disclosure, it may be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and may be made without departing from the spirit and scope disclosed herein.

What is claimed is:

1. A transmitter for performing multicarrier modulation comprising:
a processing unit configured to:
generate a multicarrier data signal comprising a plurality of subcarriers, wherein each of the plurality of subcarriers represents at least one data bit of a plurality of data bits;
select a subset of the subcarriers based on signal quality information about one or more of the subcarriers;
construct a kernel signal comprising the subset of subcarriers; and
create a digital signal comprising combining the multicarrier data signal and a peak-to-average ratio (PAR) reduction signal based on the kernel signal,
wherein a PAR of the digital signal is less than a PAR of the multicarrier data signal.

2. The transmitter of claim 1, wherein the processing unit is further configured to:
determine one or more locations where an estimated multicarrier data signal exceeds a predetermined threshold value and determine an amplitude of the estimated multicarrier data signal at each location; and
for each location, scale the kernel signal based on the amplitude and shift the kernel signal circularly based on the location to generate a scaled and shifted kernel signal corresponding to each location,
wherein the PAR reduction signal comprises a combination of the scaled and shifted kernel signals.

3. The transmitter of claim 2, wherein the signal quality information comprises a transmitter signal-to-noise ratio (SNR) for each of the plurality of subcarriers.

4. The transmitter of claim 3, wherein a subcarrier is included in the subset of subcarriers if the SNR of the subcarrier at a receiver is X decibels (dB) lower than the transmitter SNR, where X is greater than zero.

5. The transmitter of claim 4 further comprising:
a digital-to-analog converter (DAC) coupled to the processing unit; and
an analog portion coupled to an output of the DAC and configured to transmit an analog signal from the output of the DAC,
wherein the estimated multicarrier data signal is an estimate of the multicarrier data signal that takes into account all or part of the analog portion.

6. The transmitter of claim 5, wherein generating the multicarrier data signal comprises:
performing a serial-to-parallel (S/P) conversion of the data bits;
mapping the output of the S/P conversion to the plurality of subcarriers;
performing a first inverse fast Fourier transform (IFFT) on the output of the mapping;
performing a parallel-to-serial (P/S) conversion on the IFFT output;
delaying the output of the P/S conversion to generate a delayed output; and
upsampling the delayed output before or after a time-domain processing.

7. The transmitter of claim 6, wherein the processing unit is further configured to generate the estimated multicarrier data signal, wherein generating the estimated multicarrier data signal comprises:
performing a second IFFT on the output of the mapping;
performing a second P/S conversion to the second IFFT output;
upsampling the second P/S conversion output to generate an intermediate signal; and
filtering the intermediate signal,
wherein the output of the filtering is the estimated multicarrier data signal, and wherein the combining of the multicarrier data signal and the PAR reduction signal is performed in a time domain.

8. The transmitter of claim 6, wherein the processing unit is further configured to generate the estimated multicarrier data signal, wherein generating the estimated multicarrier data signal comprises:
performing a second IFFT on the output of the mapping;
performing a second P/S conversion to the second IFFT output; and
filtering the output of the second P/S conversion,
wherein the second IFFT is N times larger than the first IFFT, where N is an integer, wherein the output of the filtering is the estimated multicarrier data signal, and wherein the combining of the multicarrier data signal and the PAR reduction kernel signal is performed in a time domain.

9. A method for reducing a peak-to-average ratio (PAR) in a multicarrier transmitter comprising:
generating a multicarrier data signal comprising a plurality of subcarriers, wherein each of the plurality of subcarriers carries at least one data bit;
determining one or more locations where an estimated multicarrier data signal exceeds a predetermined threshold value and determining an amplitude of the estimated multicarrier data signal at each location;
for each location, scaling a kernel signal based on the amplitude and shifting the kernel signal circularly based on the location to generate a scaled and shifted kernel signal corresponding to each location;
if more than one location is determined, combining the scaled and shifted kernel signals to create a combined kernel signal and otherwise setting the combined kernel signal equal to a single scaled and shifted kernel signal; and
creating a digital signal comprising combining the combined kernel signal and the multicarrier data signal,
wherein a PAR of the digital signal is less than a PAR of the multicarrier data signal, and wherein the kernel signal employs a subset or all of the plurality of subcarriers.

10. The method of claim 9, wherein the kernel signal is based on subcarriers selected based on signal quality information predicted or fed back from a receiver about one or more of the subcarriers, wherein the digital signal is converted to an analog signal by a digital-to-analog converter (DAC), wherein the analog signal is transmitted by an analog portion of the multicarrier transmitter, and wherein the estimated multicarrier data signal is an estimate of the multicarrier data signal that takes into account all or part of the analog portion.

11. The method of claim 10, wherein generating the multicarrier data signal comprises:
performing a serial-to-parallel (S/P) conversion of the data bits;
mapping the output of the S/P conversion to the plurality of subcarriers;
performing an inverse fast Fourier transform (IFFT) on the output of the mapping;
performing a parallel-to-serial (P/S) conversion to the IFFT output;
delaying the output of the P/S conversion; and upsampling the delayed output before or after a time-domain processing.

12. The method of claim 11, further comprising generating the estimated multicarrier data signal comprising:
performing a second IFFT on the output of the mapping;
performing a second P/S conversion to the second IFFT output;
upsampling the second P/S conversion output to generate an intermediate signal; and
filtering the intermediate signal,
wherein the output of the filtering is the estimated multicarrier data signal, and wherein the combining of the multicarrier data signal and the combined kernel signal is performed in a time domain.

13. The method of claim 11, further comprising generating the estimated multicarrier data signal comprising:
performing a second IFFT on the output of the mapping;
performing a second P/S conversion to the second IFFT output;
filtering the second IFFT output signal,
wherein the second IFFT is N times larger than the first IFFT, where N is an integer, and wherein the output of the filtering is the estimated multicarrier data signal, and wherein the combining of the multicarrier data signal and the combined kernel signal is performed in a time domain.

14. The method of claim 10, wherein generating the multicarrier data signal comprises performing a serial-to-parallel (S/P) conversion of the data bits, mapping the output of the S/P conversion to the plurality of subcarriers, and delaying the output of the mapping.

15. The method of claim 14, further comprising generating the estimated multicarrier data signal comprising:
performing an inverse fast Fourier transform (IFFT) on the output of the mapping;
performing a parallel-to-serial (P/S) conversion on the IFFT output;
upsampling the P/S conversion output to generate an intermediate signal; and
filtering the intermediate signal,
wherein the combining of the multicarrier data signal and the combined kernel signal is performed in a frequency domain.

16. The method of claim 14, further comprising generating the estimated multicarrier data signal comprising:
performing a first inverse fast Fourier transform (IFFT) on the output of the mapping;
performing a parallel-to-serial (P/S) conversion on the first IFFT output; and
filtering the first IFFT output signal,
wherein the combining of the multicarrier data signal and the combined kernel signal is performed in a frequency domain to generate an intermediate signal, wherein the intermediate signal is input to a second IFFT, wherein the first IFFT is N times larger than the second IFFT, where N is an integer.

17. A transmitter for performing multicarrier modulation comprising:
a processing unit configured to:
generate a multicarrier data signal comprising a plurality of subcarriers, wherein each of the plurality of subcarriers represents at least one data bit;
determine one or more locations where an estimated multicarrier data signal exceeds a predetermined threshold value and determine an amplitude of the estimated multicarrier data signal at each location;
for each location, scale a kernel signal based on the amplitude and shift the kernel signal circularly based on the location to generate a scaled and shifted kernel signal corresponding to each location, wherein the kernel signal employs a subset or all of the plurality of subcarriers;
if more than one location is determined, combine the scaled and shifted kernel signals to create a combined kernel signal and otherwise setting the combined kernel signal equal to a single scaled and shifted kernel signal; and
create a digital signal comprising combining the combined kernel signal and the multicarrier data signal,
wherein a peak-to-average ratio (PAR) of the digital signal is less than a PAR of the multicarrier data signal.

18. The transmitter of claim 17 further comprising:
a digital-to-analog converter (DAC) coupled to the processing unit; and
an analog portion coupled to an output of the DAC and configured to transmit an analog signal from the output of the DAC,
wherein the estimated multicarrier data signal is an estimate of the multicarrier data signal that accounts for all or part of the analog portion.

19. The transmitter of claim 18, wherein a subcarrier is selected to be used in the kernel signal based on signal quality information about the subcarrier.

20. The transmitter of claim 19, wherein signal quality information comprises a transmitter signal-to-noise ratio (SNR) for each of the plurality of subcarriers.

21. The transmitter of claim 20, wherein a subcarrier is selected to be used in the kernel signal if the SNR of the subcarrier at a receiver is X decibels (dB) lower than the transmitter SNR, where X is greater than zero.

22. The transmitter of claim 21, wherein generating the multicarrier data signal comprises:
performing a serial-to-parallel (S/P) conversion of the data bits;
mapping the output of the S/P conversion to the plurality of subcarriers; and
delaying the output of the mapping.

23. The transmitter of claim 22, further comprising generating the estimated multicarrier data signal comprising:
performing a first inverse fast Fourier transform (IFFT) on the output of the mapping;
performing a parallel-to-serial (P/S) conversion on the first IFFT output;
upsampling the P/S conversion output to generate an intermediate signal; and
filtering the intermediate signal,
wherein the combining of the multicarrier data signal and the combined kernel signal is performed in a frequency domain to generate a second intermediate signal, wherein the second intermediate signal is input to a second IFFT.

24. The transmitter of claim 22, further comprising generating the estimated multicarrier data signal comprising:
performing a first inverse fast Fourier transform (IFFT) on the output of the mapping;
performing a parallel-to-serial (P/S) conversion on the first IFFT output; and
filtering the first IFFT output signal,
wherein the combining of the multicarrier data signal and the combined kernel signal is performed in a frequency domain to generate an intermediate signal, wherein the intermediate signal is input to a second IFFT, wherein the first IFFT is N times larger than the second IFFT, where N is an integer.

* * * * *